United States Patent

Tarusawa et al.

[11] Patent Number: 6,089,521
[45] Date of Patent: Jul. 18, 2000

[54] AUTOMOBILE SEAT SLIDE UNIT

[75] Inventors: Makoto Tarusawa; Mitsuhiro Yamashita, both of Aki-gun, Japan

[73] Assignee: Delta Kogyo Co., Ltd., Hiroshima, Japan

[21] Appl. No.: 09/069,332

[22] Filed: Apr. 29, 1998

[30] Foreign Application Priority Data

May 13, 1997 [JP] Japan ..................................... 9-122549
May 13, 1997 [JP] Japan ..................................... 9-122550

[51] Int. Cl.⁷ .................................................. F16M 13/00
[52] U.S. Cl. ...................... 248/430; 296/65.14; 297/341; 384/47
[58] Field of Search ..................................... 248/430, 429, 248/421, 419; 297/341, 344.1, 318; 74/528, 527; 384/47; 296/65.13, 65.14

[56] References Cited

U.S. PATENT DOCUMENTS

| 5,529,397 | 6/1996 | Yoshida ..................................... 384/47 |
| 5,842,383 | 12/1998 | Yamada et al. ............................ 74/528 |
| 5,848,775 | 12/1998 | Isomura et al. ......................... 248/430 |
| 5,882,074 | 3/1999 | Kojima ..................................... 297/341 |
| 5,918,847 | 6/1999 | Couasnon ................................. 248/430 |
| 5,931,436 | 8/1999 | Rohee ..................................... 248/430 |
| 5,941,495 | 8/1999 | Bauer et al. .............................. 248/430 |

FOREIGN PATENT DOCUMENTS

| 0 076 041 | 4/1983 | European Pat. Off. . |
| 0365975B1 | 10/1989 | European Pat. Off. . |
| 0 751 029 | 1/1997 | European Pat. Off. . |
| 0 753 425 | 1/1997 | European Pat. Off. . |
| 2605997 | 8/1977 | Germany . |
| 32 38 028 | 5/1983 | Germany . |
| 4201354A1 | 7/1992 | Germany . |

*Primary Examiner*—Ramon O. Ramirez
*Assistant Examiner*—Tan Le
*Attorney, Agent, or Firm*—Wenderoth, Lind & Ponack, L.L.P.

[57] ABSTRACT

An automobile seat slide unit includes two slide rail assemblies disposed on respective sides of a seat. Each of the slide rail assemblies has a lower rail to be secured to a vehicle floor and an upper rail to be secured to the seat and slidably mounted on the lower rail for adjusting the position of the seat in a direction longitudinally of a vehicle body. The lower rail has a generally flat bottom wall, two outer side walls extending upwardly from respective side edges of the bottom wall, and two inner side walls extending laterally inwardly and downwardly from respective upper edges of the outer side walls to present a shape generally similar to an inverted figure "U". On the other hand, the upper rail has a generally flat upper wall, two inner side walls extending downwardly from respective side edges of the upper wall, and two outer side walls extending laterally outwardly and upwardly from respective lower edges of the inner side walls to present a shape generally similar to the shape of a figure "U". The inner side walls of the lower rail are received within respective guide clearances each defined between the inner and outer side walls of the upper rail, while the outer side walls of the upper rail are received within respective guide clearances each defined between the inner and outer side walls of the lower rail. A plurality of spherical members are interposed between the upper and lower rails at lower corners thereof, while a plurality of rollers are interposed between upper edges of the outer side walls of the upper rail and laterally extending portions of the inner side walls of the lower rail.

11 Claims, 8 Drawing Sheets

AUTOMOBILE SEAT SLIDE UNIT

BACKGROUND OF THE INVENTION

1. Field of the Invention

The present invention relates to an automobile seat slide unit for use in adjusting the position of a seat in a direction longitudinally of a vehicle body.

2. Description of Related Art

Figure 1:
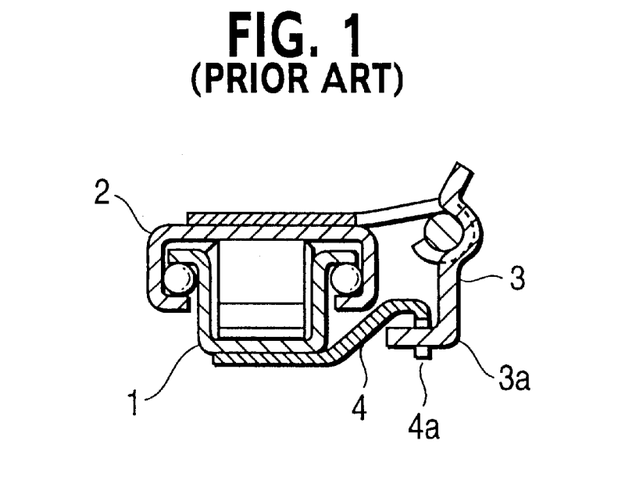
FIG. 1 is a vertical sectional view of a conventional automobile slide rail assembly.

FIG. 1 depicts a conventional automobile slide rail assembly as disclosed in Japanese Laid-Open Utility Model Application (unexamined) No. 448034, which includes a lower rail 1 secured to a vehicle floor and an upper rail 2 secured to a seat and slidably mounted on the lower rail 1.

The lower rail 1 includes a lock plate 4 secured thereto and having a plurality of lock grooves 4a defined therein at regular intervals in a direction longitudinally thereof, while the upper rail 2 includes a lock lever 3 pivotally mounted thereon and having a lock finger 3a that is engageable with one of the lock grooves 4a of the lock plate 4 to lock the seat.

In the above-described conventional slide rail assembly, however, because the lock lever 3, the lock plate 4 and the like are disposed outside the two rails 1, 2, not only the space in which legs of a rear seat occupant are placed is limited, but also the freedom of the layout or arrangement of the seat or other units adjacent thereto such as, for example, a tilt unit, a seat lift unit and the like, are limited. In addition, the seat slide unit of FIG. 1 has many component parts and is hence costly and heavy.

Figure 2:
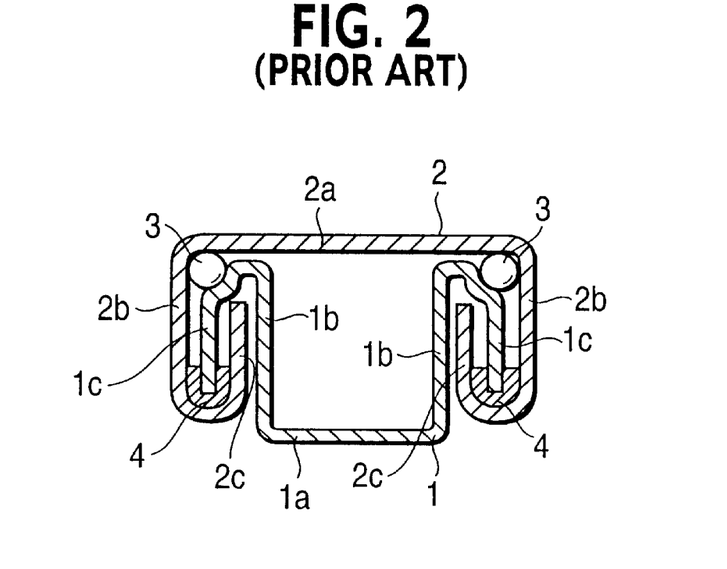
FIG. 2 is a vertical sectional view of another conventional automobile slide rail assembly.

To overcome such problems, there has been proposed another slide rail assembly as shown in FIG. 2, which includes a lower rail 1 and an upper rail 2 slidably mounted on the lower rail 1. The lower rail 1 has a bottom wall 1a, two inner side walls 1b extending upwardly from respective side edges of the bottom wall 1a, and two outer side walls 1c extending laterally outwardly and downwardly from respective upper edges of the inner side walls 1b to present a shape generally similar to the inverted shape of a figure "U". The upper rail 2 has an upper wall 2a, two outer side walls 2b extending downwardly from respective side edges of the upper wall 2a, and two inner side walls 2c extending laterally inwardly and upwardly from respective lower edges of the outer side walls 2b to represent a shape generally similar to the shape of a figure "U". In this construction, the outer side walls 2b of the upper rail 2 are located outside the associated outer side walls 1c of the lower rail 1, while the inner side walls 2c of the upper rail 2 are received within respective guide clearances each defined between the inner and outer side walls 1b, 1c of the lower rail 1 in a generally handshake fashion.

The slide rail assembly of FIG. 2 also includes a plurality of spherical members 3 interposed between an internal surface of the upper rail 2 and an external surface of the lower rail 1 at upper corners thereof, and two generally U-shaped resinous retainers 4 interposed between lower ends of the outer side walls 1c of the lower rail 1 and the associated laterally inwardly extending portions of the upper rail 2.

In this slide rail assembly, however, because the resinous retainers 4 are held in sliding contact with the upper and lower rails 2, 1, reducing looseness between the former and the latter results in an increase in the required operating force, while reducing the operating force results in increased in looseness.

SUMMARY OF THE INVENTION

The present invention has been developed to overcome the above-described disadvantages.

It is accordingly an objective of the present invention to provide an improved automobile seat slide unit capable of sliding an upper rail relative to a lower rail with a substantially constant operating force while reducing looseness between the upper and lower rails.

Another objective of the present invention is to provide the automobile seat slide unit of the above-described type which is compact and inexpensive, and can endure a relatively large load that acts on the upper rail so as to separate it from the lower rail.

In accomplishing the above and other objectives, the automobile seat slide unit according to the present invention includes two slide rail assemblies disposed on respective sides of a seat and each having a lower rail to be secured to a vehicle floor and an upper rail to be secured to the seat and slidably mounted on the lower rail for adjusting the position of the seat in a direction longitudinally of a vehicle body. The lower rail has a generally flat bottom wall, two outer side walls extending upwardly from respective side edges of the bottom wall, and two inner side walls extending laterally inwardly and downwardly from respective upper edges of the outer side walls to present a shape generally similar to an inverted figure "U". The upper rail has a generally flat upper wall, two inner side walls extending downwardly from respective side edges of the upper wall, and two outer side walls extending laterally outwardly and upwardly from respective lower edges of the inner side walls to present a shape generally similar to a figure "U". The inner side walls of the lower rail are received within respective guide clearances each defined between the inner and outer side walls of the upper rail, while the outer side walls of the upper rail are received within respective guide clearances each defined between the inner and outer side walls of the lower rail.

A plurality of spherical members are interposed between the upper and lower rails at lower corners thereof, while a plurality of rollers are interposed between upper edges of the outer side walls of the upper rail and laterally extending portions of the inner side walls of the lower rail.

By the above-described construction, the sliding movement of the upper rail relative to the lower rail is smoothly achieved by the rotation of the rotatable elements such as the rollers and the spherical members. Accordingly, the clearance between the rollers and the laterally extending portions of the inner side walls of the lower rail can be reduced to minimize looseness of the rotatable elements. Also, only a substantially constant and relatively small load is required to slide the upper rail.

Conveniently, the automobile seat slide unit further includes a plurality of retainers each holding two of the plurality of spherical members and one of the plurality of rollers. Each of the retainers acts to maintain the positional relationship between the two spherical members and the one roller.

Advantageously, each of the outer side walls of the upper rail has at least one cutout defined therein and each of the inner side walls of the lower rail has at least two depressions formed in the laterally extending portion thereof. By so doing, opposite ends of the at least one cutout and the at least two depressions serve as stoppers for restraining a sliding movement of the upper rail relative to the lower rail. The cutout and the depressions also serve to prevent removal of the roller and the spherical members from the slide rail assembly and, hence, no additional stoppers are required.

Again advantageously, the width of the guide clearances between the inner and outer side walls of the lower rail is appropriately determined to prevent inclination of the rollers.

One of the inner side walls of the lower rail has a plurality of lock projections formed therewith at a lower end thereof, while a lock plate is accommodated in the upper rail and has a first end pivotally connected to the upper rail. The lock plate also has a first horizontally extending portion extending laterally outwardly from a second end thereof opposite to the first end, and the first horizontally extending portion has a plurality of lock holes defined therein into which the lock projections are engageable to lock the upper rail relative to the lower rail. A lever having one end secured to the lock plate extends through the upper wall of the upper rail.

By this construction, upon operation of the lever, the lock plate is moved between a lock position, at which some of the lock projections are engaged into the plurality of lock holes, and an unlock position at which the lock projections are disengaged from the plurality of lock holes.

The automobile seat slide unit also includes a support shaft for pivotally supporting the lock plate relative to the upper rail and a spring wound around the support shaft for biasing the lock plate towards the lock position.

It is preferred that the lock plate has a stopper integrally formed therewith at the first end thereof to prevent the second end of the lock plate from contacting the lower rail when the lock plate is moved to the unlock position.

Both the inner side walls may have a plurality of lock projections formed therewith at lower ends thereof, while the lock plate has two horizontally extending portions extending laterally outwardly from the second end thereof in directions opposite to each other with one or more lock holes defined in each of the two horizontally extending portions.

This construction increases the locking force of the upper rail relative to the lower rail.

Advantageously, the upper rail has a depression formed with each of the two inner side walls thereof, and/or the lock plate has two projections formed at opposing side walls thereof to restrain a lateral movement of the lock plate.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENT

This application is based on applications Nos. 9-122549 and 9122550 both filed May 13, 1997 in Japan, the content of which is incorporated hereinto by reference.

It is first to be noted that because a seat slide unit so far as employed in automotive vehicles generally includes two slide rail assemblies, one on each side of a seat, which are generally of an identical construction, reference is made hereinafter to only one of the slide rail assemblies.

Figure 3:
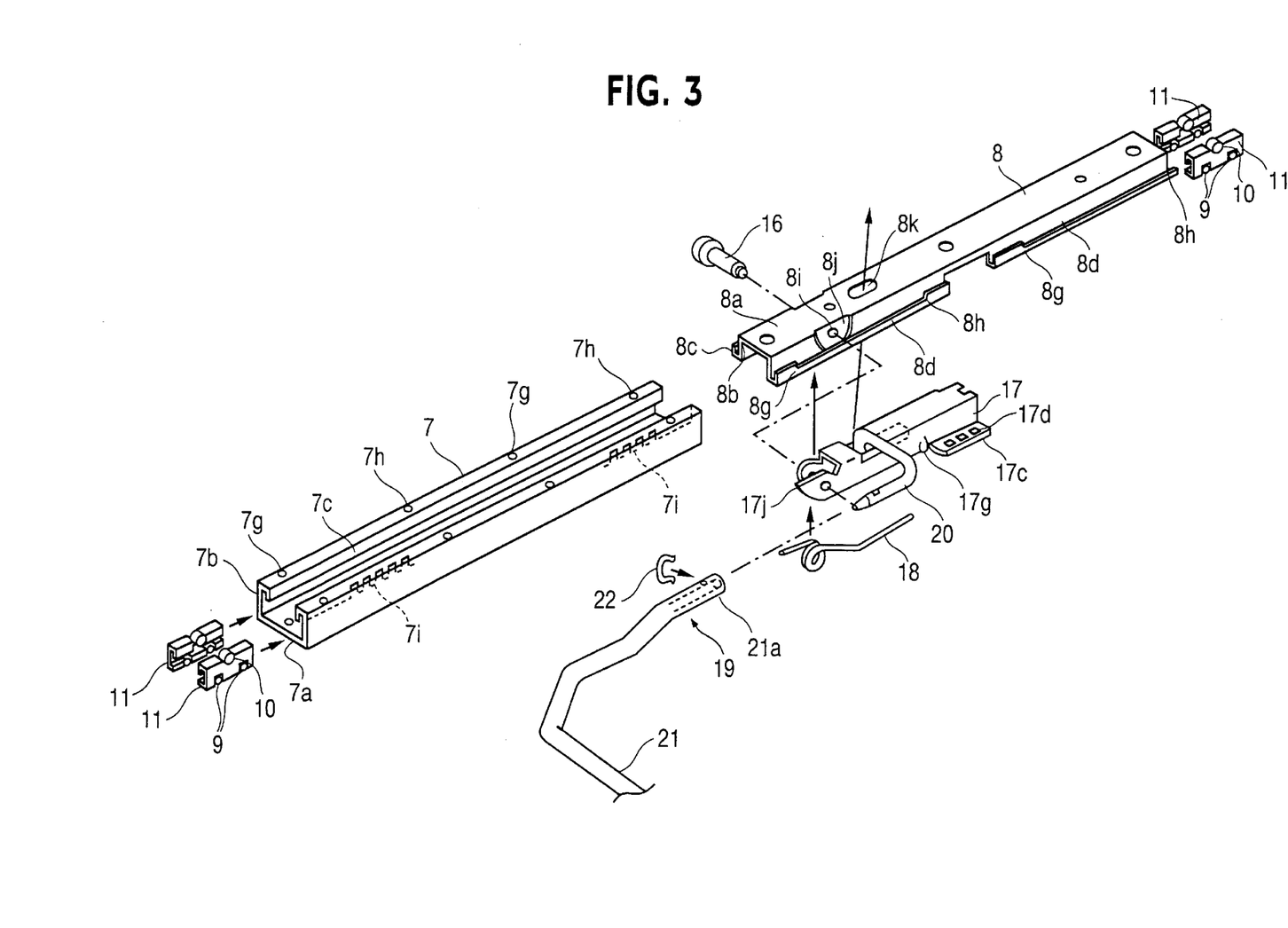
FIG. 3 is an exploded perspective view of an automobile seat slide unit according to the present invention.
Figure 4:
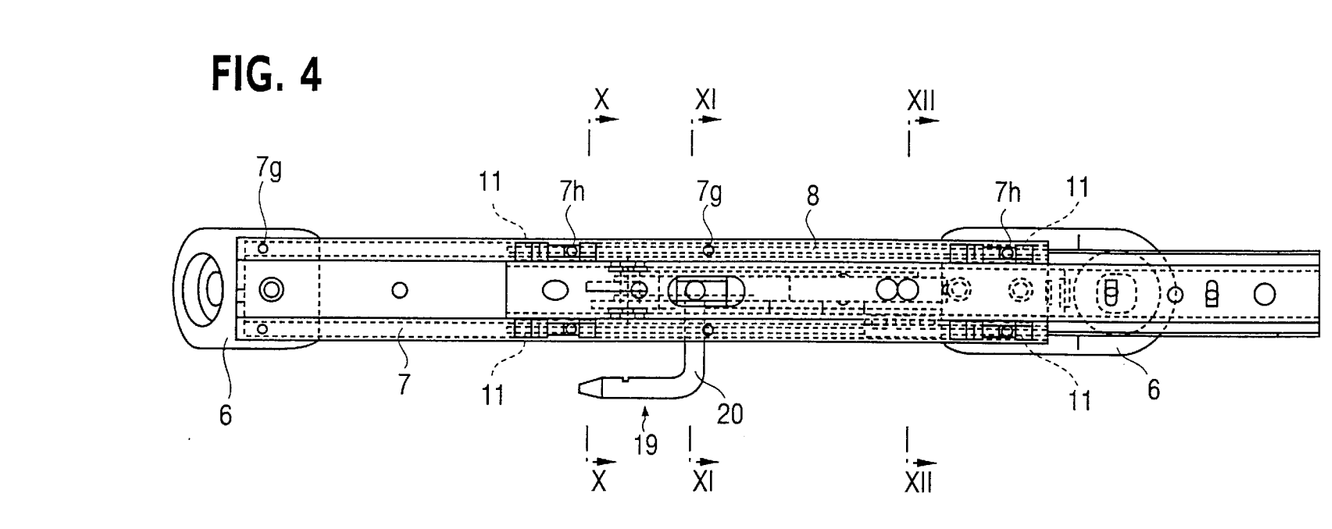
FIG. 4 is a top plan view of the automobile seat slide unit of FIG. 3.
Figure 5:
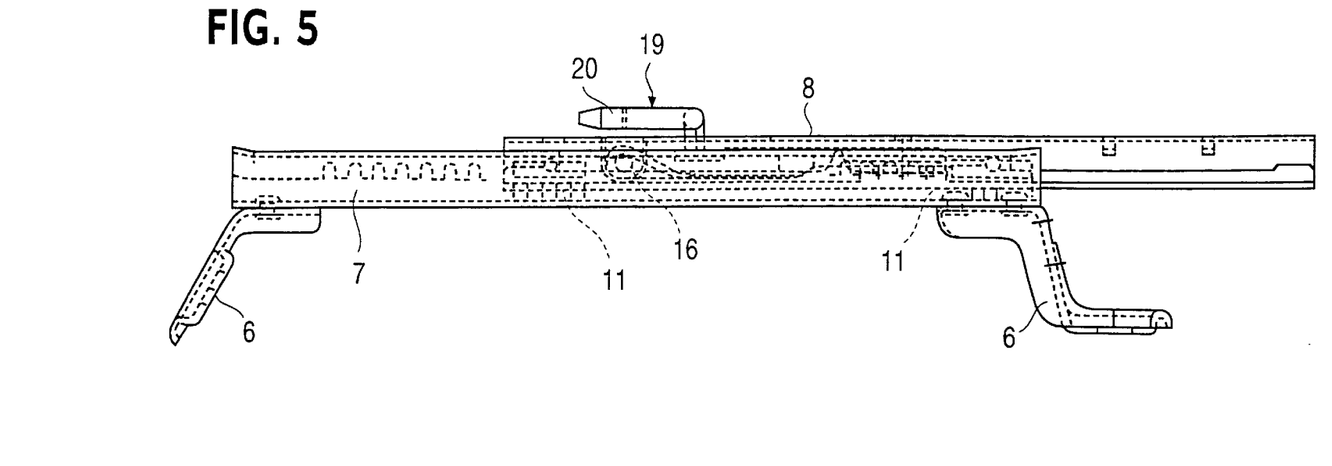
FIG. 5 is a front elevational view of the automobile seat slide unit of FIG. 3.
Figure 6:
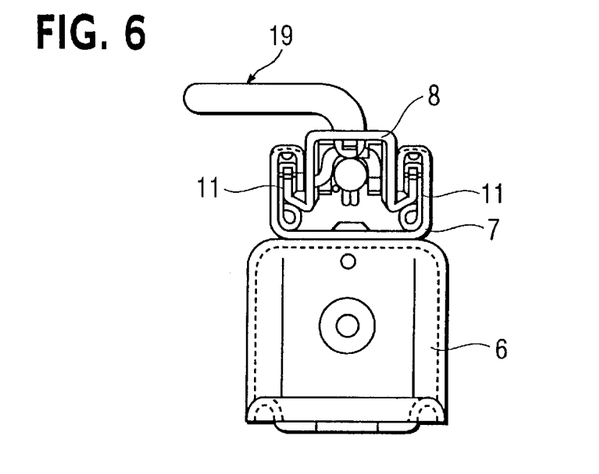
FIG. 6 is a side view of the automobile seat slide unit of FIG. 3.

FIGS. 3 to 5 depict one of two slide rail assemblies employed in an automobile seat slide unit according to the present invention. As shown therein, the slide rail assembly includes a lower rail 7 secured to a vehicle floor via front and rear legs 6, and an upper rail 8 secured to a seat cushion of the seat and slidably mounted on the lower rail 7 for adjusting the position of the seat in a direction longitudinally of a vehicle body.

Figure 7A:
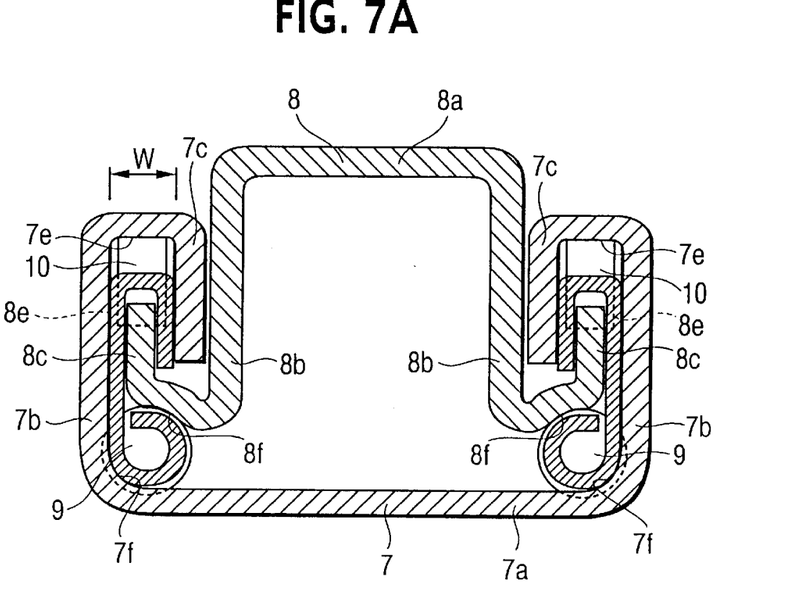
FIG. 7A is a vertical sectional view of the automobile seat slide unit of FIG. 3.
Figure 7B:
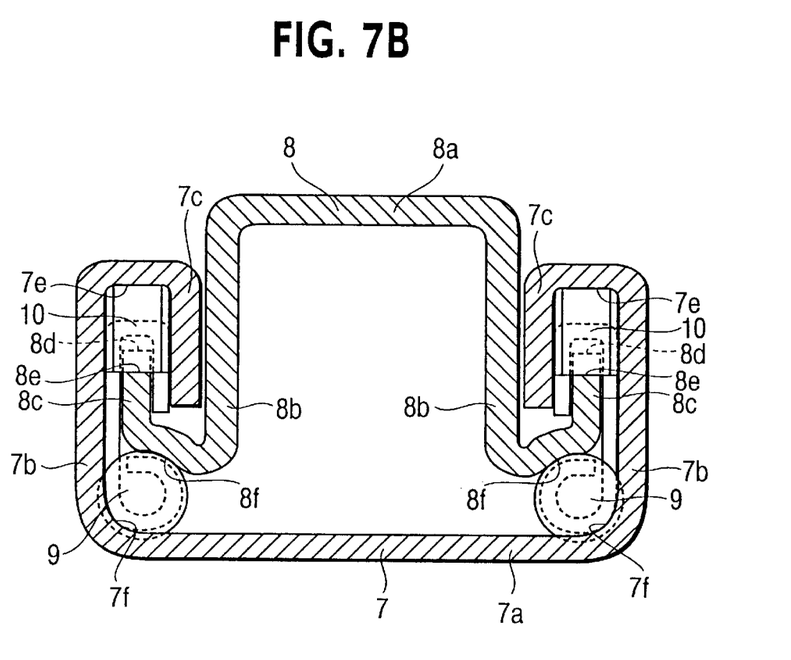
FIG. 7B is another vertical sectional view of the automobile seat slide unit of FIG. 3.

As shown in FIGS. 7A and 7B, the lower rail 7 has a generally flat bottom wall 7a, two outer side walls 7b extending upwardly from respective side edges of the bottom wall 7a, and two inner side walls 7c extending laterally inwardly and downwardly from respective upper edges of the outer side walls 7b to present a shape generally similar to the shape of an inverted figure "U". The upper rail 8 has a generally flat upper wall 8a, two inner side walls 8b extending downwardly from respective side edges of the upper wall 8a, and two outer side walls 8c extending laterally outwardly and upwardly from respective lower edges of the inner side walls 8b to present a shape generally similar to the shape of a figure "U".

In the above-described construction, the inner side walls 7c of the lower rail 7 are received within respective guide clearances each defined between the inner and outer side walls 8b, 8c of the upper rail 8, while the outer side walls 8c of the upper rail 8 are received within respective guide clearances each defined between the inner and outer side walls 7c, 7b of the lower rail 7 in a generally handshake fashion.

Each of the outer side walls 8c of the upper rail 8 has front and rear cutouts 8d defined in front and rear portions thereof.

Figure 8:
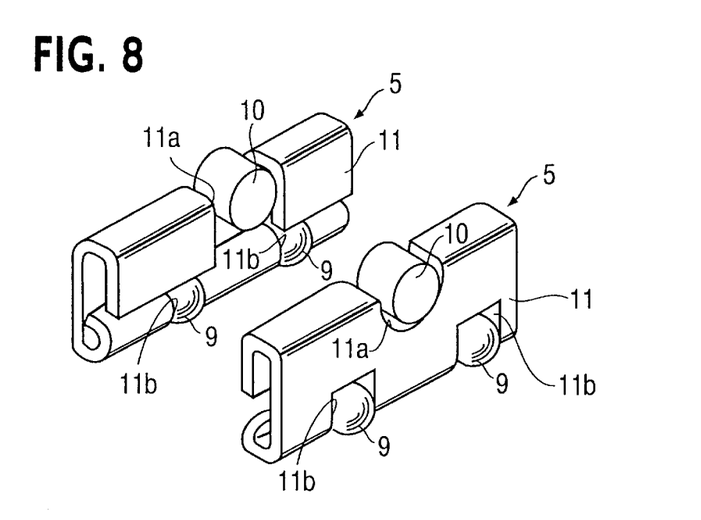
FIG. 8 is a perspective view of two roller assemblies mounted in the automobile seat slide unit of FIG. 3.
Figure 9:
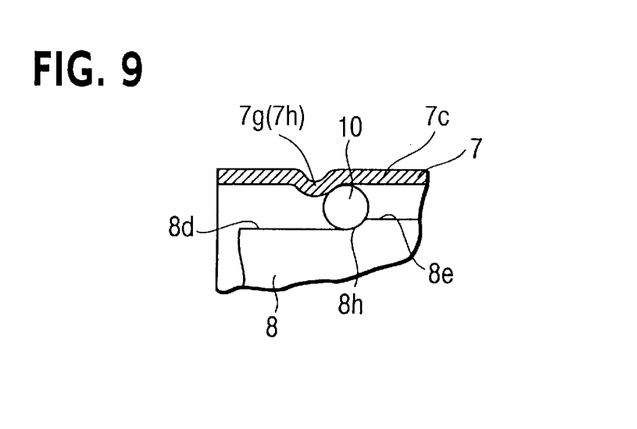
FIG. 9 is a side view, partly in section, of the automobile seat slide unit of FIG. 3, particularly depicting a relationship between an upper roller mounted in each roller assembly and stoppers formed with upper and lower rails.
Figure 10:
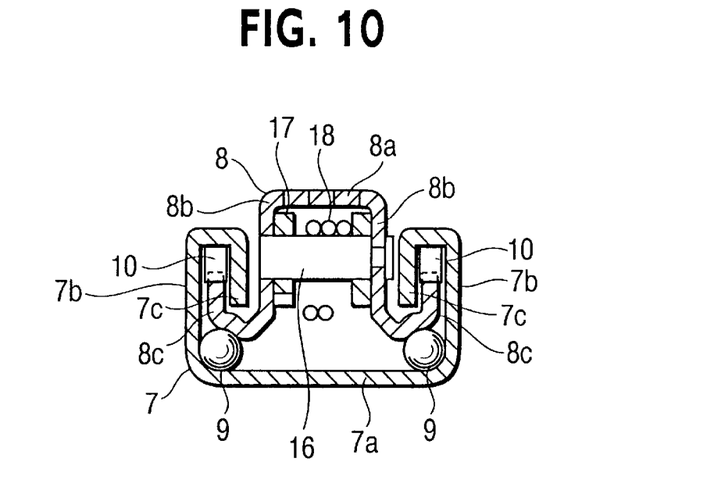
FIG. 10 is a sectional view taken along line X—X in FIG. 4.
Figure 11:
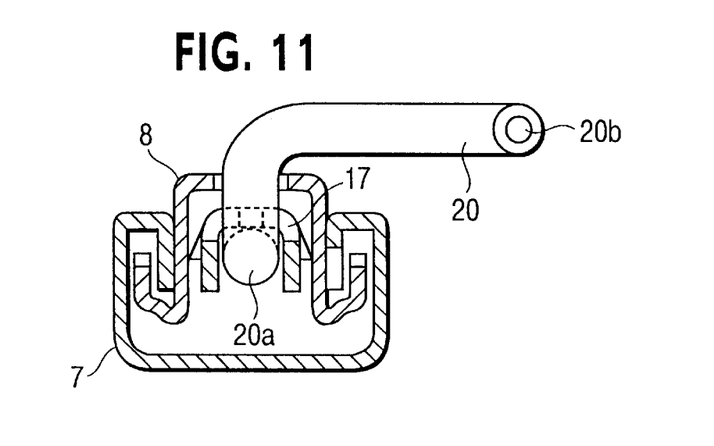
FIG. 11 is a sectional view taken along line XI—XI in FIG. 4.

The slide rail assembly also includes two front roller assemblies 5 and two rear roller assemblies 5, all of which are of an identical construction as shown in FIG. 8. Each roller assembly 5 includes an upper roller 10, two lower spherical members 9, and a retainer 11 for holding therein the upper roller 10 and the lower spherical members 9. The retainer 11 has a generally C-shaped cross section and also has an upper recess 11a defined therein at the center thereof and two lower recesses 11b defined therein on the front and rear sides of the upper recess 11a, respectively, in a direction longitudinally thereof. The upper roller 10 is rotatably received within the upper recess 11a, while the two lower spherical members 9 are rotatably received within the lower recesses 11b, respectively.

Because both the upper roller 10 and the lower spherical members 9 are rotatably retained by a single retainer 11, the positional relationship between the upper roller 10 and the lower spherical members 9 is maintained substantially unchanged, thus reducing looseness thereof and stabilizing the rigidity of the roller assembly.

Each of the front and rear roller assemblies 5 is slidably mounted in the guide clearance defined between the inner and outer side walls 7c, 7b of the lower rail 7 to allow the upper rail 8 to slide relative to the lower rail 7. Each roller assembly 5 is movable along the associated one of the cutouts 8d of the upper rail 8 and between a front end 8g and a rear end 8h thereof.

As shown in FIGS. 7A and 7B, the lower spherical members 9 are held in contact with an internal surface of the lower rail 7 and with an external surface of the upper rail 8 at lower corners thereof. Accordingly, those surfaces of the upper and lower rails 8, 7 that are held in contact with the lower spherical members 9 are curved to present a shape complementary to the shape of the lower spherical members 9. Such surfaces, however, may be inclined surfaces.

On the other hand, the upper rollers 10 have a width slightly smaller than the width W of the guide clearances between the inner and outer side walls 7c, 7b of the lower rail 7, and also have upper and side contours substantially identical to inner contours of the inner and outer side walls 7c, 7b of the lower rail 7 to prevent inclination of the upper rollers 10, thereby stably rotating the upper rollers 10 with a substantially constant operating force and preventing generation of noise.

As shown in FIGS. 3 and 8, the lower rail 7 has four depressions 7g, 7h formed in the laterally extending portion of each inner side wall 7c. The depressions 7g and the depressions 7h serve as front and rear stoppers for the associated upper rollers 10, respectively. When the upper rollers 10 are sandwiched between the depressions 7g and the rear ends 8h of the cutouts 8d, a further forward movement of the upper rail 8 relative to the lower rail 7 is prevented. On the other hand, when the upper rollers 10 are sandwiched between the depressions 7h and the front ends 8g of the cutouts 8d, a further rearward movement of the upper rail 8 relative to the lower rail 7 is similarly prevented.

Because the depressions 7g, 7h of the lower rail 7 and the cutouts 8d of the upper rail 8 also prevent removal of the upper roller 10 and the lower spherical members 9 from the slide rail assembly, no additional stoppers are required.

Also, because the upper rail 8 slides along the lower rail 7 by virtue of rotation of the upper rollers 10 and that of the lower spherical members 9, only a substantially constant and relatively small load is required to slide the upper rail 8 smoothly even if the clearance between the upper rollers 10 and the laterally extending portions of the inner side walls 7c of the lower rail 7 is reduced to minimize looseness. Moreover, even if a relatively large load is applied to the upper rail 8 in the direction in which the upper rail 8 is separated upwardly from the lower rail 7, the rigidity of the side walls of the upper and lower rails 8, 7 and that of the upper rollers 10 can withstand such a load.

The slide rail assembly includes a lock mechanism 19, which is explained hereinafter with reference to FIGS. 9 to 16.

The inner side walls 7c of the lower rail 7 have a plurality of equally spaced generally rectangular lock projections 7i, 7j formed therewith at lower ends thereof.

Figure 12:
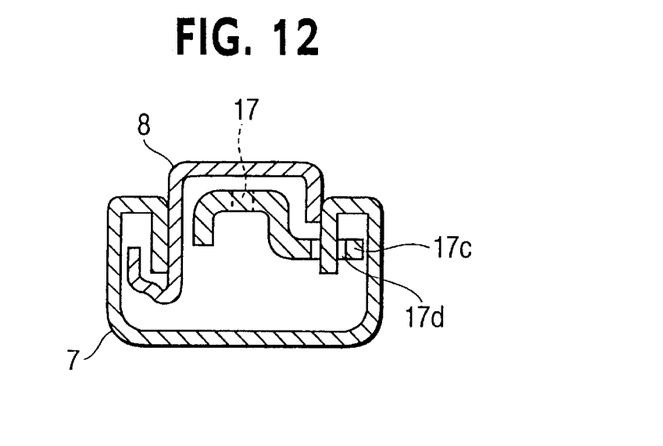
FIG. 12 is a sectional view taken along line XII—XII in FIG. 4.
Figure 15:
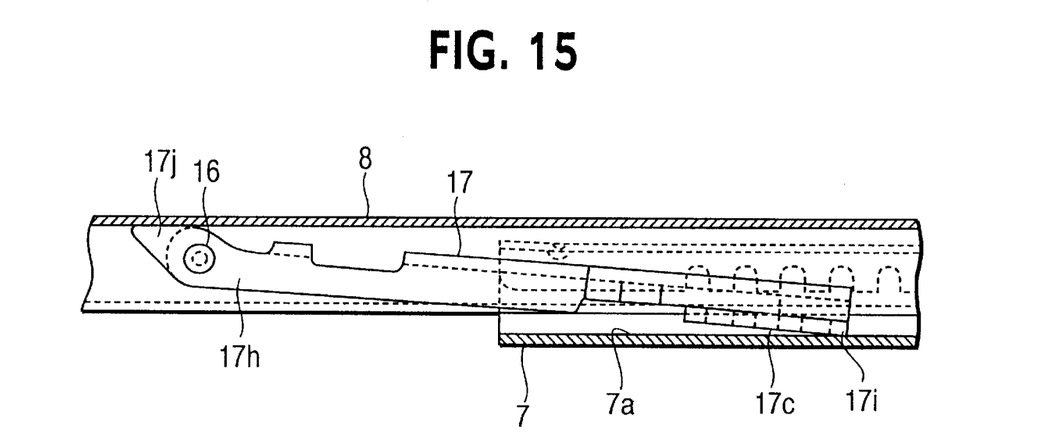
FIG. 15 is a side view, partly in section, of the lock plate in an unlock position.
Figure 16:
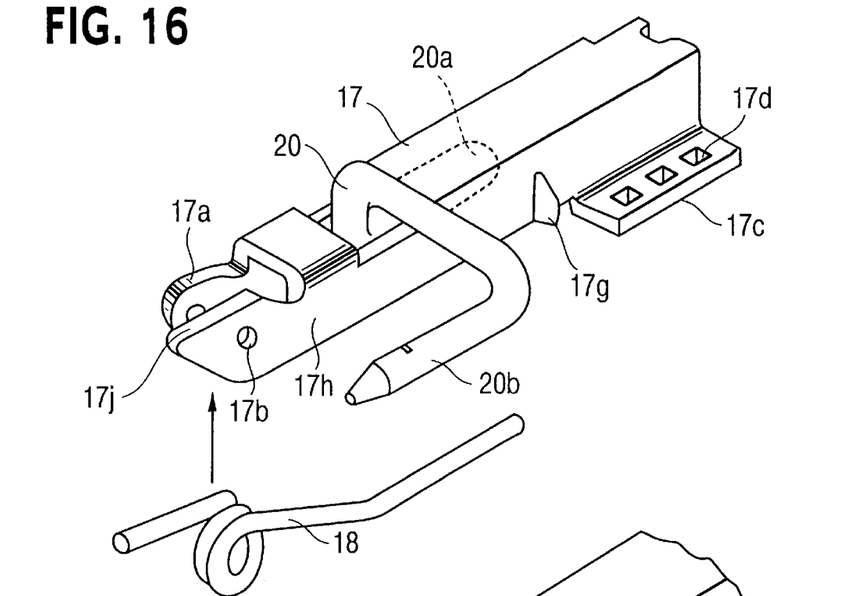
FIG. 16 is an exploded perspective view of the lock plate.
Figure 17:
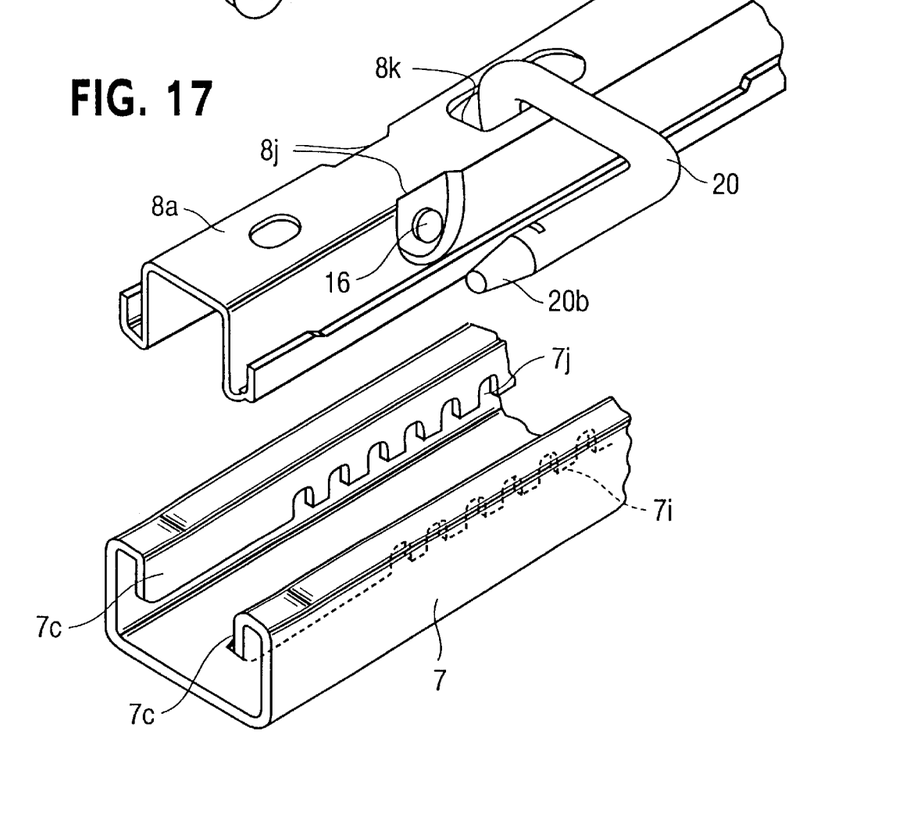
FIG. 17 is an exploded perspective view of the upper and lower rails.

A lock plate 17 having a cross section generally similar to the shape of an inverted figure "U" is pivotally mounted on the upper rail 8 and between the inner side walls 8b thereof. As best shown in FIGS. 12 and 15, the lock plate 17 has a round hole 17b defined therein at each of front side walls 17a thereof, a plurality of equally spaced generally rectangular lock holes 17d defined in a horizontally extending portion 17c extending laterally outwardly from a lower edge of one of rear side walls, and a lock hole 17f defined in another horizontally extending portion 17e extending laterally outwardly from a lower edge of the other rear side wall.

The upper rail 8 has a depression 8j formed with each of the inner side walls 8b and a round hole 8i defined in the depression 8j. The lock plate 17 is vertically pivotable relative to the upper rail 8 via a support shaft 16 inserted in the round holes 17b of the lock plate 17 and the round holes 8i of the depressions 8j of the upper rail 8. The distance between the outer surfaces of the front side walls 17a of the lock plate 17 is smaller than the distance between the inner surfaces of the inner side walls 8b of the upper rail 8 and, hence, the front side walls 17a of the lock plate 17 are interposed between the two depressions 8j of the upper rail 8 with little looseness. The lock plate 17 has two projections 17g respectively formed at the rear side walls thereof in the proximity of the horizontally extending portions 17c and 17e. These projections 17g act to eliminate looseness of the rear side walls of the lock plate 17 relative to the inner side walls 8b of the upper rail 8.

The support shaft 16 has a lock spring 18 wound therearound to bias the lock plate 17 upwardly, thereby engaging some of the lock projections 7i of the lower rail 7 into the lock holes 17d of the lock plate 17 and engaging one of the lock projections 7j of the lower rail 7 into the lock hole 17f of the lock plate 17.

It is to be noted that the horizontally extending portion 17e of the lock plate 17 may have a plurality of lock holes.

It is also to be noted that the lock projections 7i of the lower rail 7 and the associated lock hole 17f of the lock plate 17 may be dispensed with.

Figure 13:
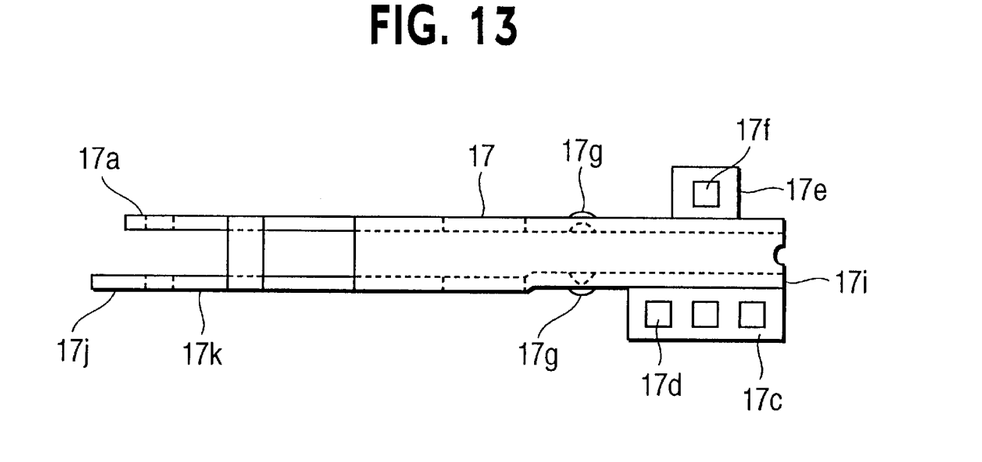
FIG. 13 is a top plan view of a lock plate accommodated in the upper rail.
Figure 14:
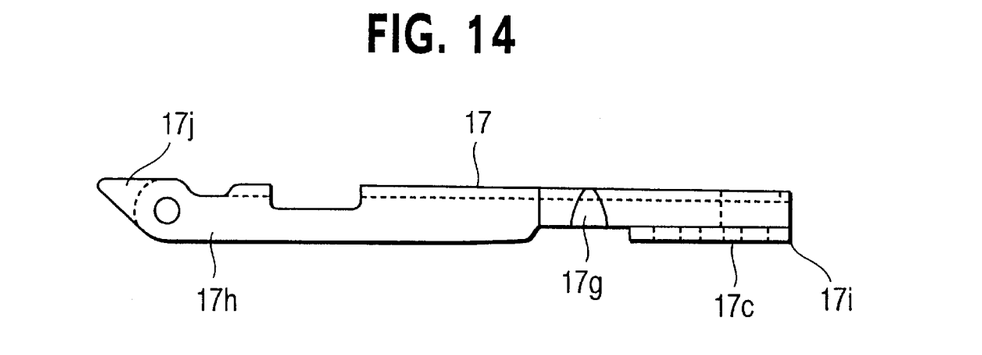
FIG. 14 is a side view of the lock plate.

As shown in FIGS. 13 and 14, the lock plate 17 has a frontwardly protruding stopper 17j integrally formed with one of the front side walls 17a thereof. When the lock plate 17 is moved downwardly to an unlock position, an edge of the frontwardly protruding stopper 17j abuts against the inner surface of the upper wall 8a of the upper rail 8 to prevent a rear end 17i of the lock plate 17 from being brought into contact with the upper surface of the bottom wall 7a of the lower rail 7.

A lever 20 is rigidly secured at its rear end 20a to an inner surface of an upper wall of the lock plate 17. This lever 20 extends frontwardly from the rear end 20a thereof and is bent upwardly, laterally outwardly, and then frontwardly. The upwardly extending portion of the lever 20 extends through an elongated opening 8k defined in the upper wall 8a of the upper rail 8 with the laterally outwardly extending portion and the frontwardly extending portion of the lever 20 located outside the upper rail 8. A front end 20b of the lever 20 is inserted into and connected to a rear end 21a of a pipe-shaped lock lever 21 extending to a location close to and below a front edge of the seat. Removal of the lock lever 21 from the lever 20 is prevented by a C-shaped ring 22.

It is to be noted here that although the lock mechanism 19 referred to above is incorporated into one or both of the two slide rail assemblies, the lock lever 21 is incorporated into only one of them.

The lock mechanism 19 referred to above operates as follows.

When a seat occupant operates the lock lever 21 to move upwardly against the biasing force of the lock spring 18, the lock plate 17 is moved downwardly to thereby release engagement of the horizontally extending portions 17c and 17e with the associated lock projections 7i, 7j of the lower rail 7. In this unlock condition, because the upper rail 8 is freely movable relative to the lower rail 7, the seat can be moved frontwardly or rearwardly.

When the seat occupant releases the lock lever 21 at any desired position, the lock plate 17 is moved upwardly by means of the biasing force of the lock spring 18. As a result, some of the lock projections 7i and one of the projections 7j of the lower rail 7 are inserted into the lock holes 17d and the lock hole 17f of the lock plate 17, respectively, thereby locking the seat.

In the above construction, most of the lock mechanism 19 including the lock plate 17, the lock spring 18 and the like is neatly housed within the upper rail 8, and no members but the lever 20 are exposed outwardly thereof, enlarging the space in which legs of a rear seat occupant are placed and also enlarging the freedom of layout for other devices adjacent to the slide rail assembly. Also, because the lock mechanism 19 is essentially made up of the support shaft 16, the lock plate 17, the lock spring 18 and the like, the number of component parts is reduced, making it possible to reduce the cost and weight of the seat slide unit.

Furthermore, the provision of the frontwardly protruding stopper 17j on the lock plate 17 prevents the rear end 17i of the lock plate 17 from contacting the bottom wall 7a of the lower rail 7. Accordingly, dragging of the rear end 17i of the lock plate 17 is positively avoided during sliding movement of the upper rail 8 relative to the lower rail 7.

Also, engagement of the lock projections 7i, 7j of the lower rail 7 with the associated horizontally extending portions 17c, 17e of the lock plate 17 locks the upper rail 8 to the lower rail 7 on both sides of the slide rail assembly, enhancing the rigidity of the slide rail assembly.

In addition, formation of the depressions 8j in the inner side walls 8b of the upper rail 8 and formation of the projections 17g on the lock plate 17 restrain a lateral movement of the lock plate 17 within the upper rail 8, thus making vertical movement of the lock plate 17 smooth and reducing looseness of the lock plate 17 relative to the upper rail 8.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An automobile seat slide unit comprising:
    two slide rail assemblies to be disposed on respective sides of a seat and each having a lower rail to be secured to a vehicle floor and an upper rail to be secured to the seat and slidably mounted on said lower rail for adjusting a position of the seat in a direction longitudinally of a vehicle body;
    said lower rail having a generally flat bottom wall, two outer side walls extending upwardly from respective side edges of said bottom wall, and first and second inner side walls extending laterally inwardly and downwardly from respective upper edges of said outer side walls, said first inner side wall having a plurality of lock projections formed therewith at a lower end thereof;
    said upper rail having a generally flat upper wall, two inner side walls extending downwardly from respective side edges of said upper wall, and two outer side walls extending laterally outwardly and upwardly from respective lower edges of said inner side walls;
    a lock plate accommodated in said upper rail and having a first end pivotally connected to said upper rail, said lock plate also having a first horizontally extending portion extending laterally outwardly from a second end thereof opposite to the first end, said first horizontally extending portion having a plurality of lock holes defined therein into which said lock projections are engageable to lock said upper rail relative to said lower rail; and
    a lever having one end secured to said lock plate and extending through said upper wall of said upper rail;
    wherein upon operation of said lever, said lock plate is moved between a lock position, at which some of said lock projections are engaged into said plurality of lock holes, and an unlock position at which said lock projections are disengaged from said plurality of lock holes.

2. The automobile seat slide unit according to claim 1, and further comprising a support shaft for pivotally supporting said lock plate relative to said upper rail and a spring wound around said support shaft for biasing said lock plate towards the lock position.

3. The automobile seat slide unit according to claim 1, wherein said lock plate has a stopper integrally formed therewith at a first end thereof, and wherein when said lock plate is moved to the unlock position, said stopper prevents the second end of said lock plate from contacting said lower rail.

4. The automobile seat slide unit according to claim 1, wherein said second inner side wall has a plurality of lock projections formed therewith at a lower end thereof, and said lock plate has a second horizontally extending portion extending laterally outwardly from a second end thereof in a direction away from said first horizontally extending portion, said second horizontally extending portion having at least one lock hole defined therein into which one of said plurality of lock projections of said second inner side wall is engageable to lock said upper rail relative to said lower rail.

5. The automobile seat slide unit according to claim 1, wherein said upper rail has a depression formed with each of said two inner side walls thereof to restrain a lateral movement of said lock plate.

6. The automobile seat slide unit according to claim 1, wherein said lock plate has two projections formed at opposing side walls thereof to restrain a lateral movement of said lock plate.

7. An automobile seat slide unit comprising:
    two side rail assemblies to be disposed on respective sides of a seat and each having a lower rail to be secured to a vehicle floor and an upper rail to be secured to the seat and slidably mounted on said lower rail for adjusting a position of the seat in a direction longitudinally of a vehicle body;
    said lower rail having a generally flat bottom wall, two outer side walls extending upwardly from respective side edges of said bottom wall, and two inner side walls extending laterally inwardly and downwardly from respective upper edges of said outer side walls to present a shape generally similar to an inverted figure "U";

said upper rail having a generally flat upper wall, two inner side walls extending downwardly from respective side edges of said upper wall, and two outer side walls extending laterally outwardly and upwardly from respective lower edges of said inner side walls to present a shape generally similar to a figure "U";

said inner side walls of said lower rail being received within respective guide clearances each defined between said inner and outer side walls of said upper rail, said outer side walls of said upper rail being received within respective guide clearances each defined between said inner and outer side walls of said lower rail;

a plurality of spherical members interposed between said upper and lower rails at lower corners thereof;

a plurality of rollers interposed between upper edges of said outer side walls of said upper rail and laterally extending portions of said inner side walls of said lower rail; and a plurality of retainers each holding two of said plurality of spherical members and one of said plurality of rollers.

8. The automobile seat slide unit according to claim 7, wherein each of said outer side walls of said upper rail has at least one cutout defined therein, each of said inner side walls of said lower rail has at least two depressions formed in a laterally extending portion thereof, and opposite ends of said at least one cutout and said at least two depressions serve as stoppers for restraining a sliding movement of said upper rail relative to said lower rail.

9. The automobile seat slide unit according to claim 7, wherein a width of said guide clearances between said inner and outer side walls of said lower rail is appropriately determined to prevent inclination of said plurality of rollers.

10. The automobile seat slide unit according to claim 7, wherein a width of said guide clearances between said inner and outer side walls of said lower rail is appropriately determined to prevent inclination of said plurality of rollers.

11. An automobile seat slide unit comprising:

two side rail assemblies to be disposed on respective sides of a seat and each having a lower rail to be secured to a vehicle floor and an upper rail to be secured to the seat and slidably mounted on said lower rail for adjusting a position of the seat in a direction longitudinally of a vehicle body;

said lower rail having a generally flat bottom wall, two outer side walls extending upwardly from respective side edges of said bottom wall, and two inner side walls extending laterally inwardly and downwardly from respective upper edges of said outer side walls to present a shape generally similar to an inverted figure "U";

said upper rail having a generally flat upper wall, two inner side walls extending downwardly from respective side edges of said upper wall, and two outer side walls extending laterally outwardly and upwardly from respective lower edges of said inner side walls to present a shape generally similar to a figure "U";

said inner side walls of said lower rail being received within respective guide clearances each defined between said inner and outer side walls of said upper rail, said outer side walls of said upper rail being received within respective guide clearances each defined between said inner and outer side walls of said lower rail;

a plurality of spherical members interposed between said upper and lower rails at lower corners thereof;

a plurality of rollers interposed between upper edges of said outer side walls of said upper rail and laterally extending portions of said inner side walls of said lower rail; and each of said outer side walls of said upper rail having at least one cutout defined therein, each of said inner side walls of said lower rail having at least two depressions formed in a laterally extending portion thereof, and opposite ends of said at least one cutout and said at least two depressions serving as stoppers for restraining a sliding movement of said upper rail relative to said lower rail.

* * * * *